United States Patent [19]

Landwer

[11] 3,825,323

[45] July 23, 1974

[54] ROTARY DISC RECORDING AND READOUT SYSTEM HAVING CAPACITANCE CONTROLLED LENS POSITIONING MEANS

[75] Inventor: Donald C. Landwer, Arlington Heights, Ill.

[73] Assignee: Teletype Corporation, Skokie, Ill.

[22] Filed: May 17, 1973

[21] Appl. No.: 361,376

[52] U.S. Cl. ............... 350/255, 318/662, 324/61 R, 340/173 TP, 346/76 L, 346/137

[51] Int. Cl. ......................... G02b 7/02, G01d 15/14

[58] Field of Search .................. 346/76 L, 108, 137; 318/662; 95/44 R; 350/255, 46; 324/61 R; 178/6.6 T, 6.6 P; 340/173 T, 173 P

[56] References Cited

UNITED STATES PATENTS

| | | | |
|---|---|---|---|
| 3,118,787 | 1/1964 | Katchman | 346/135 X |
| 3,475,760 | 10/1969 | Carlson | 346/76 L X |
| 3,623,790 | 11/1971 | Buckstad et al. | 324/61 R X |

*Primary Examiner*—Joseph W. Hartary
*Attorney, Agent, or Firm*—John L. Landis

[57] ABSTRACT

The focal plane of a focused energy beam is adjusted to match the instantaneous position of the surface of a nonconductive film being treated by the beam. For example, the position of a focused laser beam used to record and read-out data in the surface of a moving thermoplastic film is adjusted to accommodate vagaries in the location of successive spots along the surface of the film. The film is formed on the surface of a record, which is mounted on a turntable during recording and readout. The positioning is done by backing the film with a conductive surface of the record; mounting an electrode to the lens used to focus the beam, in closely spaced relationship to the film; and sensing the capacitance between the conductive surface and the electrode. The sensed capacitance is used to drive a servomotor for adjusting the position of the lens so that the focal plane coincides with the surface of the film.

4 Claims, 6 Drawing Figures

ROTARY DISC RECORDING AND READOUT SYSTEM HAVING CAPACITANCE CONTROLLED LENS POSITIONING MEANS

INTRODUCTION AND BACKGROUND

This invention relates generally to precise positioning of a focused energy beam with respect to an insulating film, and particularly to precise positioning of a focused laser beam on the surface of a moving thermoplastic film and to record assemblies useful in beam recording.

While the invention has general utility for many applications it is especially useful in various processes for recording information or data on a nonconductive recording surface using an energy beam such as a laser, wherein extremely precise positioning of the energy beam with respect to the surface is desired. One particular process in which the invention can very profitably be used is a "laser writing," or recording process used to generate a memory by localized melting of selected areas along recording tracks in the surface of a thermoplastic film. Such a process may be generally as disclosed in a commonly assigned copending application of Leonard A. Nash, Ser. No. 349,132, filed Apr. 9, 1973; H. Fleisher et al., U.S. Pat. No. 3,262,122; or C. O. Carlson U.S. Pat. No. 3,475,760, all herein incorporated by reference.

In such processes, the laser beam is selectively focused on the surface of a moving film to "write," and thereby generates minute melted depressions in the surface of the film, which can later be read out in various ways such as are disclosed in the material cited above or in an article "Color LP Discs Coming" by J. F. Lowe, in *Design News*, Dec. 4, 1972, page 43, herein incorporated by reference. This process has the prospect of recording vast amounts of information per unit area of the film, because of the small size of the focused beam which can be used; for example, in one application of the process, over 4,000,000 individual bits of binary data have been recorded per square inch of record surface. In these laser-recording processes, the laser beam is moved relative to the record in a regular pattern of one type or another to form a track or channel, and the laser is effectively turned on or off according to the binary data, to record 1's and 0's along the track in accordance with the data, melt or no melt when using thermoplastic films.

This is one of many processes which have been proposed for recording information on a laser-responsive film or substrate of one kind or another. Similar processes have been proposed, using other types of energy beam, such as an electron beam in S. P. Newberry et al., U.S. Pat. No. 3,120,991, herein incorporated by reference.

In all of these beam-recording processes, it is advantageous to use a rotary disc as the record member, with a movable recording arm, such that the recording process generates a spiral track, or a set of concentric circular tracks in the record surface, generally analogous to the process used in making phonograph records. Rotary-disc recording and/or read out processes along this line are described in the Nash application, the Newberry et al., U.S. Pat. and the Lowe article. The rotary disc approach to recording is very attractive, in that the recording process is very simple, a large amount of information can be recorded in a relatively small area, and playback or readout is relatively simple.

SUMMARY OF THE INVENTION

A specific object of this invention is to provide an extremely precise system for positioning a focused energy beam with respect to a nonconductive working surface, particularly for continuously positioning a focusing lens of a laser unit so that the focal plane of the lens always coincides with the surface of a moving thermoplastic film.

With the foregoing and other objects in view, a beam-positioning system in accordance with the invention includes a surface of conductive material underlying a nonconductive film on which the beam operates. An electrode is physically connected to the focusing lens, and is positioned in noncontacting proximity to the surface of the film. A mechanism, such as a servomotor, is provided for adjusting the position of the lens in response to the capacitance between the conductive layer and the electrode, so that the focal plane of the lens always coincides with the surface of the film.

For example, when used in laser writing in a thermoplastic film, a conductive film such as silver, copper or aluminum is deposited on a glass substrate used to form the record disc, and the thermoplastic film is then deposited on the conductive surface. Preferably, a ring-shaped electrode is mechanically mounted to the lens, coaxially of the beam, and projects toward the surface of the film. An electrical signal is applied between the conductive film and the electrode, and deviations from a nominal capacitance preset to conform to the correct focus distance are fed back to a servomechanism for correcting the position of the lens to follow instantaneous deviations in the position of successive recording areas in the moving surface of the film.

Other objects, advantageous and features of the invention will appear from the following detailed description of a specific embodiment thereof, when taken in conjunction with the appended drawings.

DRAWINGS

In the drawings, FIG. 1 is a partially schematic perspective view of a laser-recording system, using a beam-positioning arrangement according to the invention.

DETAILED DESCRIPTION

Background - Recording and Reproducing Process

Figure 1:
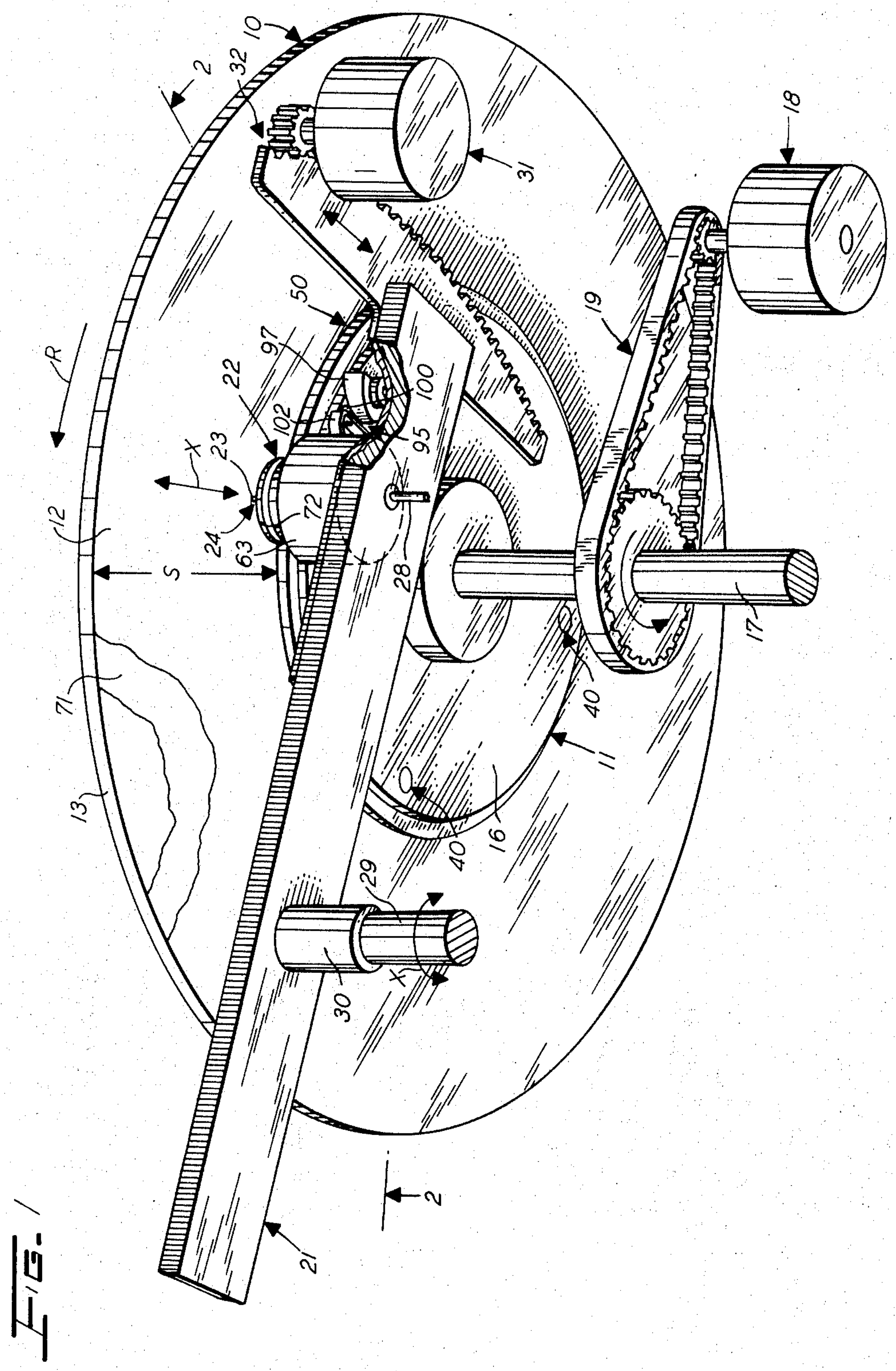
Figure 2:
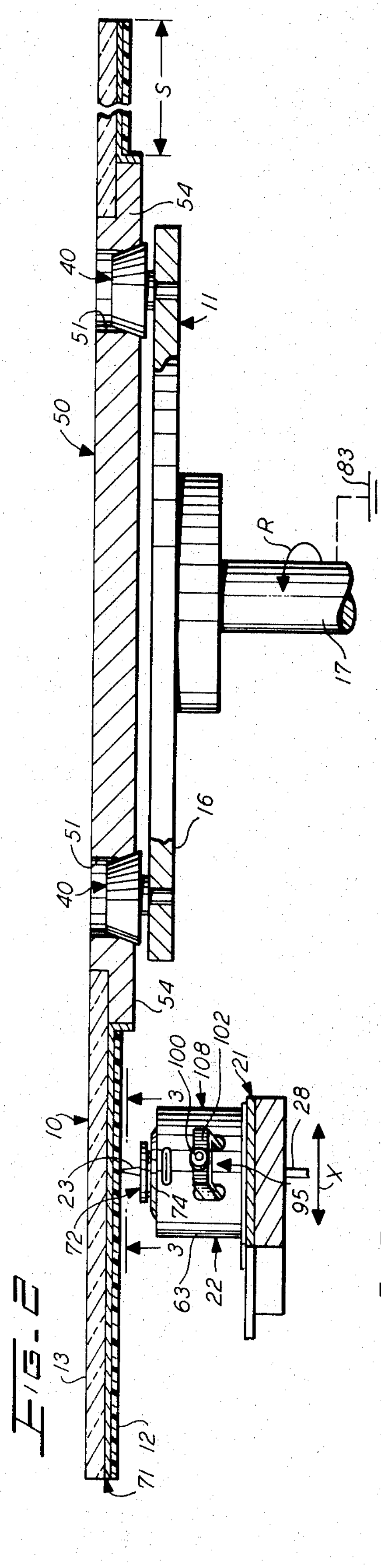
FIG. 2 is a vertical sectional view of the recording mechanism, taken generally along the line 2—2 of FIG. 1 but with certain vertical dimensions exaggerated for illustrative purposes.

Referring to the drawings, FIGS. 1 and 2 illustrate either the recording or the reproducing process, involving a record 10 detachably mounted on a turntable 11 in accordance with the principles of the Nash application. The record 10 includes a thin thermoplastic film 12 applied to the under surface of a backing disc or substrate 13 of high melting point material, such as glass. The film 12 may be an acrylic resin, or various other thermoplastic materials such as are mentioned in the Fleisher et al., or Carlson U.S. Pats., and preferably is dyed with a material to increase its absorption of the laser energy to be applied.

The turntable 11 includes a flat disc or platform 16, above which the record 10 is received, and a shaft 17 for rotating the turntable 11 and record 10 (arrow R) by a constant speed drive motor 18 of any conventional type, for example through a sprocket-and-belt transmission 19.

Figure 3:
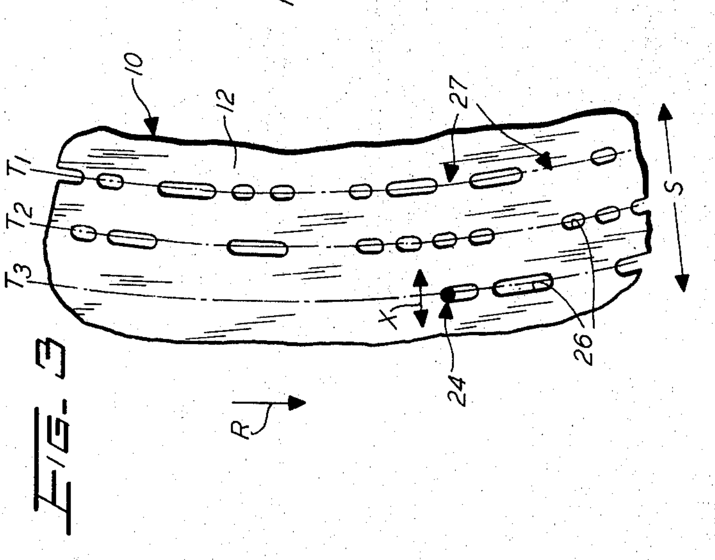
FIG. 3 is a greatly enlarged fragmentary view of a portion of a recording, taken generally along the line 3—3 of FIG. 2.

A recording arm 21 is mounted below the turntable 11 and parallel to the record 10, generally similar in arrangement to a standard phonograph recording arm. The arm 21 carries a generally conventional lens assembly 22 for projecting a focused laser beam 23 on a small spot 24 on the surface of the thermoplastic film 12. For example, as explained in the Fleisher et al., or Carlson U.S. Pats., when recording, the laser beam is either focused or not focused on the film 12, depending on the data to be recorded, or effectively is turned "on" and "off" as far as recording is concerned. As explained in those patents, this causes localized melting of the surface of the film 12 to form depressions or grooves such as 26 (FIG. 3) in the surface of the moving film 12 whenever the beam 23 has been turned "on," to record. When off, untouched areas or lands 27 are left between the grooves 26. An input laser beam 28 may be applied to the lens assembly 22 in any of various known ways, for example as shown in the Fleisher et al or Carlson U.S. Pats., or the Lowe article.

The recording arm 21 is mounted on a shaft 29 parallel to the turntable shaft 17, for pivoting movement (arrow X) about the axis of the shaft 29. In the example illustrated, the shaft 29 is rotatable and is mounted in bushings such as 30 (one shown). The arm 21 may be pivoted, when desired, by a conventional reversible drive motor 31 through a gear or other transmission system 32. With this arrangement, the lens assembly 22 can traverse the recording surface (S) of the record 10 in generally conventional fashion so as to form a spiral recording track around the record 10, or the lens assembly 22 can be stepped along the surface to preselected positions so as to form a plurality of concentric circular recording tracks, three of which are designated as $T_1$, $T_2$, $T_3$, in FIG. 3. When recording in concentric circular tracks, the motor 31 is a stepping motor, which can be energized to align the lens assembly 22 and thus the focused beam 23 with any selected one of several thousand recording tracks which can be formed along the recording surface. In this case, the transmission 32 should include motion-reducing gearing to permit extremely precise control over the position of the focused beam 23. Further details of typical recording processes, and steps which can be used with some materials to erase a recorded message, are described in the Fleisher et al., and Carlson U.S. Pats.

To read out the previously recorded information, the record 10 is preferably remounted on the same turntable 11, a desired channel or track T is selected by the stepping motor 31, and the turntable motor 18 is turned on. In this example, a "reading," or nondestructive laser beam, similar in position to the beam 23, is applied to the record 10 by the lens 22. Generally, as described in the Lowe article, the amount of light energy of the reading beam reflected back to the lens 22 differs sufficiently, based on whether a groove 26 or a land 27 is present at any time, that this difference can be sensed by conventional means and converted into a binary data signal corresponding to the recorded data, in a known fashion.

The record 10 is mounted in the turntable 11 as nearly as possible in an exact and precisely repeatable horizontal plane. As described in detail in the Nash application, this is preferably accomplished by providing a triangular array of three conically tapered mounting pins 40 (two shown in FIG. 2) projecting upward from the upper surface of the turntable 11. A central metallic hub 50 of the record, preferably of a relatively soft metal such as brass, is then positioned on the turntable 11 so that a set of three coined, matingly tapered mounting holes 51 in the hub 50 seat on the pins 40. With this arrangement, the hub 50 is spaced from the turntable platform 16 and is supported above the platform solely on the pins 40.

Figure 4:
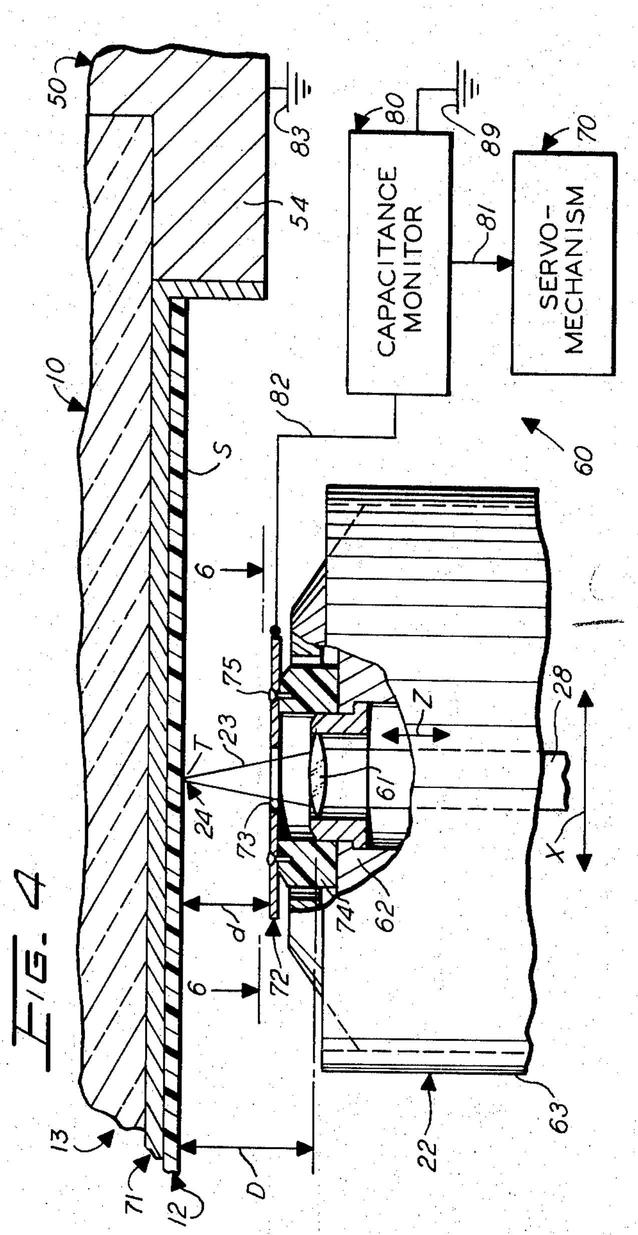
FIG. 4 is an enlarged partially schematic vertical section of portions of the beam-positioning system, corresponding generally to a portion of FIG. 2.

As illustrated in FIGS. 2 and 4, the glass backing disc or substrate 13 is secured to the hub 50, as by cementing on an annular shoulder 54 at the outer edge of the hub 50, so as to mount the disc 13 as nearly as possible flat and parallel to the surface of the hub 50. Thus, when the record 10 is placed on the turntable 11 as in the Nash application, this provides a very precise positioning of the record 10 on the turntable 11 with the under or recording surface S of the record as nearly horizontal as possible, and as nearly as possible in a fixed, repeatable horizontal recording plane bearing a fixed, predetermined vertical spacing between the record 10 and the recording arm 21.

For good recording and read out, it is important to have the recording surface S as flat and horizontally planar as possible. For this purpose, a flat glass is preferred for the substrate 13, preferably a glass which has a very smooth surface. In one specific embodiment, commercial window glass is employed in the system, having a thickness of 0.065 inch. However, other materials capable of providing a relatively strong and dimensionally stable disc 13 with a flat surface can be used, such as aluminum or other metals.

Beam-Positioning System - General Arrangement

Referring now to FIG. 4, this invention concerns a system 60 for positioning the focused beam 23 precisely on the recording surface S at all times in the recording and read out processes, as the record 10 rotates and the recording arm 21 and lens assembly 22 step or traverse to positions aligned with any and all possible recording locations in the recording surface S.

In one typical example, wherein a commercially available helium-neon continuous wave laser is used for recording in a 30,000 Angstroms thick acrylic film 12, the lens assembly 22 is a commercially available 10 power, N.A. = 0.25 lens system. In FIG. 4, a single focusing lens 61 is shown for purposes of illustration having a focal plane or focus distance D, which is defined as the distance between the center of the lens 61 and the tip of the focused beam 23. In the actual lens assembly used, the focusing is done by a vertically stacked array of three lenses, which in sequence properly focus the input beam 28 at the desired distance D. In one typical example, the focus distance D is chosen as 0.16 millimeters, which provides for good recording and read out in the process described, using a relatively low powered laser. For the purposes of description of this invention, the uppermost lens 61 illustrated will be regarded as equivalent to the actual array of three lenses.

In the specific example, the lenses constituting the equivalent lens 61, and other optical components used in the process, are mounted in a lens housing 62 comprising a cylindrical metal tube, as is customary in the optical art. The lens housing 62 is movable in a vertical direction according to arrow Z in FIG. 4, within a fixed outer support or holder 63 of the lens assembly 22. The lens housing 62 is so moved to position the lens 61 by a servomechanism 70 described in a following section of this application.

Thus, in the partially schematic illustration in FIG. 4, the positioning system 60 is designed to adjust the instantaneous vertical position of the lens housing 62 so that the focal plane of the lens 61 is always coincident with the recording surface S, despite irregularities in flatness or slight warpage of the substrate 13, or other process vagaries that might alter the instantaneous horizontal position of the spot 24 being recorded or read out at any time. For example, as the record 10 rotates in the record/turntable system, the manufacturing process variations may cause the outer edge of the record 10 to rise and fall by as much as ±0.007 inch. The positioning system 60 is designed so that lens assembly 22 will follow this motion within ±0.0005 inch.

In order to continuously monitor the focus distance D, the recording disc 13 is provided with a thin electrically conductive layer or coating 71, preferably of silver, copper or aluminum, covering the entire under surface of the glass mounting disc or substrate 13 and in electrical contact with the central hub 50, which is preferably formed of an electrically conductive material, such as brass, as previously described.

In a typical example, the glass substrate 13 is first cemented to the hub 50, seated on the flat shoulder 54 as illustrated in FIGS. 2 and 4, and the entire under surface of the glass is then silvered in any conventional fashion, as by silver painting, to deposit the required film 71 of silver on the entire under surface of the glass substrate 13. As depicted in exaggerated fashion in FIGS. 2 and 4, the silver film 71 is also deposited on the entire outer vertical edge of the hub 54 to provide the desired electrical contact with the hub 50. With the conductive layer 71 deposited on the substrate 13, the thermoplastic film 12 is then deposited on the outer surface of the layer 71 to form the recording surface S.

The thermoplastic film 12 is preferably extremely thin, for example 20,000 to 120,000 Angstrom units, and may be applied to the surface of the film 71 by spin coating or other appropriate methods, to form a film 12 of as uniform a thickness as possible, with the outer recording surface S following the under surface of the substrate 13 and film 71 as closely as possible.

Other conductive films can be employed for the layer 71, the only requirements being that a thin, flat film can be deposited on the substrate 13 in a thickness sufficient to cover the entire recording area, and that external electrical contact can be made to the film 71 as by connection through the hub 50. Copper or aluminum are also highly suitable for the conductive layer 71, and can be applied to the glass substrate 13 by known techniques, such as electroless plating. In the case where a conductive substrate 13 such as an aluminum disc is used, a separate conductive film such as 71 is not required, and the substrate itself serves as the conductive surface underlying the thermoplastic film 12. As previously mentioned, glass substrates 13 are presently preferred primarily because of excellent surface flatness characteristics that can be obtained in relatively inexpensive commercially available glass sheets such as window glass.

Figures 5, 6:
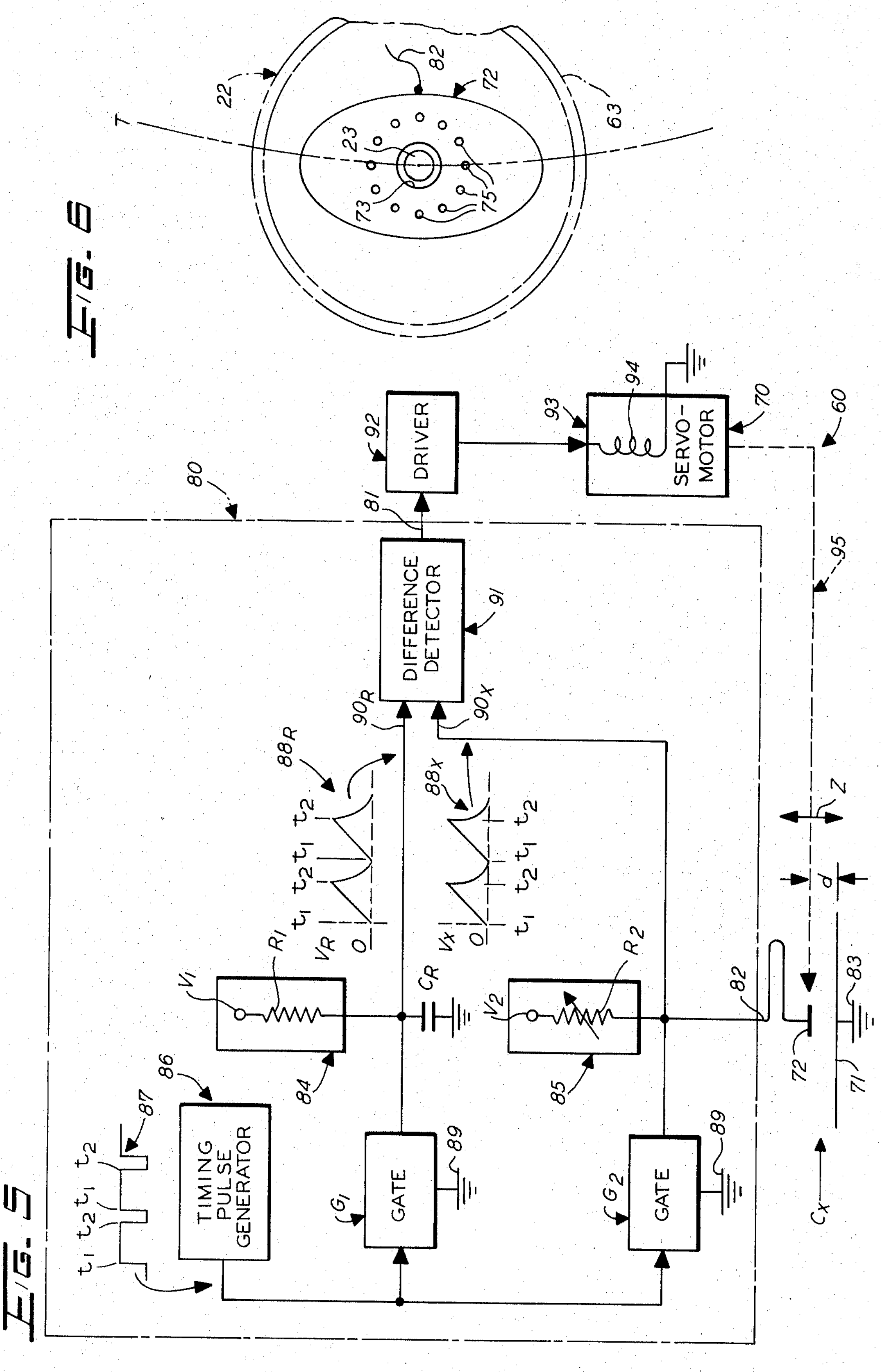
FIG. 5 is a circuit diagram of a capacitance monitoring circuit constituting a portion of the beam-positioning system.
FIG. 6 is a fragmentary top view of an electrode forming part of the capacitance monitor circuit, taken generally along the line 6—6 of FIG. 4.

Referring to FIGS. 4 and 6, the positioning system 60 also includes an electrode 72 physically connected to the lens housing 62, and positioned in noncontacting proximity to the recording surface S of the film 12. Preferably, the electrode 72 is a thin, flat conductive metal ring, having a circular central hole 73 concentrically mounted with respect to the lens 61 and the focused beam 23, and projecting from the lens housing 62 toward the recording surface S as shown in FIG. 4. In the embodiment illustrated, the electrode 72 is mounted to the lens housing by securing the electrode on top of an electrically insulating plastic supporting cylinder or collar 74, as by rivets 75. The collar 74 in turn is detachably secured in the desired position atop the cylindrical lens housing 62, as by a force fit. Preferably, the electrode 72 is electrically insulated from the lens system so as to avoid a short circuit to ground through the lens assembly 22.

In practice, it is desirable to position the electrode 72 sufficiently close to the recording surface S to obtain a useful range of capacitance to the metal coating 71, but without running the risk of ever contacting the surface S physically under any circumstances. In one working example, the distance *d* from the electrode 72 to the surface S is set in the range of 10–15 thousandths of an inch. (As previously noted, the vertical dimensions in FIG. 4 are greatly exaggerated to illustrate the principles of operation.)

Since the electrode 72 is fixed to the lens housing 62, and since the focal plane of the lens 61 is fixed in operation, one can exactly set the focus distance D of the lens 61 by setting the electrode-to-surface distance *d*. This is done by connecting the conductive film 71 and the electrode 72, to a capacitance-measuring circuit or monitor 80 (FIG. 5), which continuously monitors the instantaneous capacitance $C_X$ between the electrode 72 and the aligned spot on the conductive film 71 underlying the region of the film 12 where recording or reading is then occurring.

As is well known, the capacitance between two parallel plates (71–72) varies inversely as the distance between the plates which is essentially the distance *d* in this example since the plastic film 12 is so thin, as previously mentioned, and so controllable in thickness that it can be ignored in the calculations for all practical purposes. Thus, the monitor 80 essentially senses the instantaneous vertical position of successive spots or areas 24 on the surface S where reading of recording is taking place, as the record 10 rotates to bring successive spots on a selected recording track T into alignment with the focused beam 23, and thus with the concentrically mounted electrode 72.

As will be explained in detail in the following section, the monitor 80 senses instantaneous deviations in the circuit capacitance $C_X$ from a preset reference capacitance $C_R$, which is set as a function of the required distance *d* for proper focus, and transmits a differential output 81 to the servomechanism 70 for adjusting the position of the lens 61 in the Z direction to correct the focal plane so that it coincides precisely with the recording surface S at all times.

In the embodiment illustrated, the monitor circuit 80 is electrically connected to the electrode 72 by a flexible lead 82, which may be an insulated conductor connected electrically to the electrode 72 in any conventional fashion, such as by a soldered joint. The conductive film 71 is effectively connected in the monitor circuit 80 by grounding the hub 50, as indicated by the ground symbol 83 in FIGS. 2 and 4. As previously discussed, the conductive film 71 is preferably connected electrically to the hub 50; thus, a circuit ground is established through the hub 50, the three mounting pins 40 (two of which are shown in FIG. 2), and thence through the turntable platform 16 to a grounded metal support frame (not shown) for the turntable shaft 17.

Preferably, the surface area of the electrode ring 72, which effectively determines the area of the capacitor plates 71–72, is set so as to provide a convenient operating valve of capacitance $C_X$ between the plates 71–72 for the monitor 80 to sense; for example, in the 10–20 picofarad range. Since the capacitance $C_X$ to be sensed is a direct function of the plate area (in this case the surface area of the electrode 72), and an inverse function of the distance *d* as previously discussed, the area is chosen in view of *d* and the dielectric constant to obtain the useful range for $C_X$. In practice, a surface area of the order of 1 to 1½ square inches has been found to be useful together with a *d*-spacing of 10–15 mils. It is preferred not to make the area of the electrode 72 too large, as that would decrease the sensitivity somewhat. This follows because the capacitance $C_X$ measured actually gives an indication of the average distance from the electrode 72 to the overlapping annular area around the spot 24 being recorded or read out, which in turn is used to provide an indication of the distance from the spot 24 to the electrode 72. Thus, as the area of the electrode 72 increases, the sensitivity to minute surface variations decreases.

To minimize capacitance deviations when recording near the outer edges of the recording surface S, it is preferred to shape the ring 72 as an ellipse, as illustrated in FIG. 6, with the major axis running in the direction of the recording tracks T, tangent to the track being recorded or read at any time. In one example, a 1½ × 1 inch ellipse was profitably utilized, with a circular central hole 73 for the focused beam 23 of approximately 0.050 inch.

Capacitance Monitor - 80

Referring now to FIG. 5 the capacitance monitor circuit 80 functions to compare the instantaneous capacitance $C_X$ between the plates 71–72 at all times against the standard or reference capacitor $C_R$, and to generate an error signal or differential output 81 that drives the servomechanism 70 in the direction required to restore the variable capacitance $C_X$ to its predetermined nominal value. As previously described, the nominal value for $C_X$ is predetermined to give the desired optimum focus distance D for the lens 61.

While various generally conventional circuits can be used for sensing the capacitance $C_X$ and generating a differential output in response to deviations, a preferred embodiment of the circuit is illustrated in FIG. 5. In this circuit, D. C. power sources $V_1$ and $V_2$ are connected through series resistors $R_1$ and $R_2$ to the capacitors $C_R$ and $C_X$, as shown. The combination $V_1$-$R_1$ provides a fixed current driver 84 for charging the reference capacitor $C_R$. The resistor $R_2$ is variable so that the combination $V_2$-$R_2$ comprises an adjustable current driver 85 for charging the variable capacitor $C_X$ under test, through the flexible conductor 82 as previously described.

A timing pulse generator 86, comprising a conventional rectangular wave generator or clock, generates a sequence of timing pulses as illustrated in the waveform 87, which turn ON and OFF a pair of transistor switches or gates $G_1$, $G_2$ connected respectively to the capacitors $C_R$ and $C_X$ as shown. At a time $t_1$, for example, the gates $G_1$ and $G_2$ turn OFF, and the capacitors $C_R$ and $C_X$ charge toward the voltages applied by the drivers 84 and 85, as indicated by the upwardly sloping portions of the waveforms $\mathbf{88}_R$ and $\mathbf{88}_X$ in FIG. 5. At a time $t_2$, the timing signal 87 turns the gates $G_1$ and $G_2$ ON, so that the capacitors $C_R$ and $C_X$ discharge through the gates $G_1$ and $G_2$ to circuit ground 89, as indicated by the downward sloping portions of the waveforms $\mathbf{88}_R$ and $\mathbf{88}_X$.

In operation, the resistor $R_2$ is adjusted, and the circuit and timing values are so chosen, that the capacitors $C_R$ and $C_X$ charge to about 50 percent of their maximum values during the period $t_1$-$t_2$ (typically 1 to 1½ microseconds), and are then rapidly discharged after $t_2$ and before the next occurrence of $t_1$ (typically ½ microsecond). The parameters are set so that the accumulated charges on the capacitors $C_R$ and $C_X$, thus the potentials appearing on output leads $\mathbf{90}_R$ and $\mathbf{90}_X$, are identical when $C_X$ is equal to the nominal value. Either the capacitor $C_R$ is set equal to the nominal value of $C_X$, or a ratio can be used with $V_1$ and $R_1$ suitably chosen so that the output voltages depicted by waveforms $\mathbf{88}_R$ and $\mathbf{88}_X$ are identical when the system is correctly balanced and the lens 61 is properly focused.

Whenever the potentials on the leads $\mathbf{90}_R$ and $\mathbf{90}_X$ are different, as the capacitors $C_R$ and $C_X$ repeatedly charge and discharge, the difference is sensed by a voltage-difference detector 91, such as a conventional operational amplifier circuit, which provides an amplified differential output or error signal at the output 81, of a polarity based on the sense of the difference in the inputs $\mathbf{90}_R$ and $\mathbf{90}_X$.

The error signal at the output 81, when generated, operates a conventional driver circuit 92 forming part of the servomechanism 70, which then energizes a reversible servomotor 93 to rotate in the direction required to move the lens 61 and the plate 72 so as to equalize the capacitor outputs $\mathbf{90}_R$ and $\mathbf{90}_X$ so as to rebalance the monitor circuit 80. The driver circuit 92 may be generally standard, and in one example includes a push-pull current amplifier circuit for driving the motor coil 94 so as to rotate the motor 93 a corresponding amount in the selected direction. The servomotor 93 operates through a mechanical linkage designated by the dashed line 95 to raise or lower the sensing electrode 72 (arrow Z), thus restoring the proper focus distance D for the lens 61 as previously described.

When the circuit 70 is in balance, and the output from $C_R$ at $\mathbf{90}_R$ equals the output from $C_X$ at $\mathbf{90}_X$, there is no differential output 81 from the detector 91, and the driver 92 and servomotor 93 thus are not operated until a further deviation occurs.

The servomechanism 70, including the servomotor 93 and the mechanical linkage 95, for raising and lowering the lens housing 62 may be of any conventional design, the main requirement being precise, repeatable control over the vertical position of the lens assembly 62 within the fixed outer folder 63. A preferred embodiment of the mechanical positioning mechanism and linkage 95 is disclosed in a commonly assigned copending application of Roger B. Badgett, Ser. No. 361,375, filed on the same day as this application.

As described in that application, the servomotor 93 rotates a cylindrical cam 97 (FIG. 1), on which a cam following roller 100 rides, the cam roller 100 being mounted on a bail member 102 also shown in FIG. 2. The bail member 102 is pivotably mounted in the fixed holder 63 and engages portions of the lens housing 62 so as to move it up and down on a precise vertical axis in response to rotation of the cam 97. As the motor 93 turns the cam 97 in either direction, based on detected deviations in capacitance, the cam 97 raises or lowers the lens 61 in the direction required to re-establish the preset focus distance D and thus drives the capacitance $C_X$ back to its nominal value.

From the foregoing description, it should be apparent that there has been provided a simple and effective lens positioning system, responsive to instantaneous variations in the position of the recording surface S to automatically and quickly reset the proper focus distance. The system is sensitive to variations of the order of 0.0005 inch, when recording or reading with a beam of the type described. The sensor, further, is as accurate on read out as in writing, which is very important in the proposed use of the recording system. This ability to precisely position the lens 22 at all times allows the mechanical requirements for the record 10 to be considerably relaxed, which greatly reduces the manufacturing cost. Also, the mechanical portions of the mechanism 70 are sufficiently compact and light in weight that they can be mounted on the recording arm 21, which is a great advantage in that separate consoles are not required and the lens position can readily be adjusted on the fly.

While one specific embodiment and usage of the invention, has been described in detail above, it will be obvious that various modifications may be made from the specific details, steps and uses described, without departing from the spirit and scope of the invention. In particular, while the invention is especially useful for laser writing in thermoplastic films, it may readily be used in other applications involving a focused beam where a precise focal plane is required to be coincident with the surface of a relatively moving workpiece, and where the surface of the workpiece is even minutely irregular or otherwise can become incorrectly spaced from the lens.

What is claimed is:

1. In combination with a recording and reproducing system of the type having an adjustable lens assembly for focusing an energy beam on the surface of a record having a nonconductive recording film supported on a conductive substrate, a ring-shaped electrode physically connected to the lens assembly and concentrically arranged with respect to the beam, the electrode projecting from the lens assembly toward the film and being positioned in noncontacting proximity to the surface of the film, and means for adjusting the position of the lens assembly in response to the capacitance between the electrode and the conductive substrate so that the focal plane of the lens coincides with the surface of the film at all times, the improvement wherein:

1. a record and rotary turntable assembly is provided, the record being a circular disc having a conductive outer surface and the recording film comprising a thermoplastic film permanently deposited on the conductive surface of the record, the record being mounted for rotation with the turntable when information is to be recorded or read out from the record;
2. means are provided for mounting the lens assembly with respect to the turntable, said mounting means including a recording arm movable with respect to the turntable to position the lens assembly opposite to any selected one of a plurality of generally circular recording channels formed in the recording surface of the record; and
3. the electrode comprises a flat disc mounted parallel to the record on the turntable, the electrode having a circular central hole aligned concentrically with respect to the beam and having an elliptical perimeter, the major axis of the ellipse being positioned tangent to the selected recording channel.

2. In combination with a recording and reproducing system of the type having an adjustable lens assembly for focusing an energy beam on the surface of a record having a nonconductive recording film supported on a conductive substrate, an electrode physically connected to the lens assembly and projecting from the lens assembly toward the film, and means for adjusting the position of the lens assembly in response to the capacitance between the electrode and the conductive substrate so that the focal plane of the lens coincides with the surface of the film at all times, the improvement wherein:

a record and rotary turntable assembly is provided, the record comprising a circular disc having a flat glass substrate, a conductive metal film deposited on the outer surface of the glass substrate and selected from the group consisting of copper, silver, and aluminum, and the recording film comprising a thermoplastic permanently deposited on the conductive film on the record, the record being mounted for rotation with the turntable when information is to be recorded or read out from the record;

means are provided for mounting the lens assembly with respect to the turntable, said mounting means including an arm movable with respect to the turntable to position the lens assembly opposite to any selected one of a plurality of generally circular recording channels formed in the recording surface of the record; and the electrode comprises a flat disc mounted parallel to the record on the turntable, the electrode having a circular central hole aligned concentrically with respect to the beam and having an elliptical perimeter, the major axis of the ellipse being positioned tangent to the selected recording channel.

3. In combination with a recording and reproducing system of the type having an adjustable lens assembly for focusing an energy beam on the surface of a record having a nonconductive recording film supported on a conductive substrate, an electrode physically connected to the lens assembly and projecting from the lens assembly toward the film, and means for adjusting the position of the lens assembly in response to the capacitance between the electrode and the conductive substrate so that the focal plane of the lens coincides with the surface of the film at all times, the improvement wherein:

a record and rotary turntable assembly is provided, the record comprising a circular disc having a flat glass substrate, a conductive metal film deposited on the outer surface of the glass substrate and selected from the group consisting of copper, silver, and aluminum, and the recording film comprising a thermoplastic film permanently deposited on the conductive film on the record, the record being mounted for rotation with the turntable when information is to be recorded or read out from the record;

the record further comprises a conductive metal hub, on which the glass disc is cemented and which is arranged for mounting concentrically on the turntable;

the conductive metal film extends inwardly past the glass substrate into electrical contact with the hub;

the turntable is made of conductive metal and is grounded; and the means for adjusting the position of the lens assembly includes means for applying a potential to the electrode to generate a measurable capacitance between the electrode and the grounded conductive film underlying the recording film.

4. In combination with a system of recording information in a recording surface of a moving thermoplastic film, and reading out recorded information, of the type wherein the recording surface is exposed to a focused beam of actinic radiation from a focusing lens assembly positioned in spaced relationship to the surface of the film, an improved automatically focusing recording and reproducing apparatus, which comprises:

a record assembly having a central hub of electrically conductive material, a record substrate consisting of an annular circular disc secured to the hub and projecting outwardly therefrom, the substrate having a flat electrically conductive outer surface extending into electrical contact with the hub, the thermoplastic recording film being deposited on the conductive surface as a flat film defining an annular recording surface;

a grounded rotary turntable of electrically conductive material having a horizontal platform and a shaft extending vertically downward from the platform, for rotating the turntable;

electrically conductive means for detachably mounting the record hub on the turntable for rotation therewith when it is desired to record or reproduce from a particular record assembly, the mounting means being arranged so that the recording surface is located in a predetermined horizontal plane around the turntable, and so that the conductive surface of the substrate underlying the recording film is electrically connected to ground through the hub and the turntable;

a pivoted recording arm mounted in spaced relationship to the turntable and to the recording surface of the record when placed on the turntable;

a lens assembly mounted on the recording arm and including an outer holder fixed to the record arm, and a focusing lens housing for projecting a focused beam toward the recording surface, the lens housing being reciprocably mounted within the lens holder for vertical movement toward and away from the recording surface of the thermoplastic film so as to permit adjustment of the focus of the beam with respect to the recording surface;

means for pivoting the recording arm with respect to the record so as to select a particular generally circular track on the surface of the record for recording or reading out with the focused beam;

an electrode physically connected to the lens unit for vertical movement therewith and spaced from the recording surface of the thermoplastic film, the electrode being electrically insulated from the lens unit;

means for continuously applying an electrical signal to the electrode so as to establish instantaneous values of capacitance between the electrode and the grounded conductive surface of the substrate, indicating the position of the lens unit with respect to the recording surface and thus the focus distance of the beam;

capacitance monitoring means for sensing the capacitance to ground between the electrode and the conductive surface and for comparing the instantaneous values of sensed capacitance with a reference capacitance based on the desired focus distance so as to generate a difference signal based on deviations from the reference capacitance; and a servomechanism responsive to the capacitance monitoring means for vertically positioning the lens unit in the holder so as to adjust the focus distance to the desired length.

* * * * *